(12) United States Patent
Kobayashi

(10) Patent No.: US 7,487,251 B2
(45) Date of Patent: Feb. 3, 2009

(54) COMMUNICATION CONTROL UNIT AND COMMUNICATION CONTROL METHOD APPLIED FOR MULTICAST-SUPPORTING LAN

(75) Inventor: Naofumi Kobayashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 759 days.

(21) Appl. No.: 10/191,761

(22) Filed: Jul. 9, 2002

(65) Prior Publication Data

US 2003/0041171 A1 Feb. 27, 2003

Related U.S. Application Data

(63) Continuation of application No. 09/170,663, filed on Oct. 13, 1998, now Pat. No. 6,457,059.

(30) Foreign Application Priority Data

Jun. 17, 1998 (JP) ................... 10-170339

(51) Int. Cl.
*G06F 15/173* (2006.01)
(52) U.S. Cl. .................. 709/230; 709/204; 709/238
(58) Field of Classification Search ................. 370/390, 370/401; 709/230
See application file for complete search history.

(56) References Cited

U.S. PATENT DOCUMENTS 5,608,726 A 3/1997 Virgile

| 5,818,838 | A | * | 10/1998 | Backes et al. | 370/401 |
| 5,982,775 | A | * | 11/1999 | Brunner et al. | 370/401 |
| 5,999,530 | A | * | 12/1999 | LeMaire et al. | 370/401 |
| 6,370,142 | B1 | * | 4/2002 | Pitcher et al. | 370/390 |
| 6,735,201 | B1 | * | 5/2004 | Mahajan et al. | 370/390 |
| 6,785,274 | B2 | * | 8/2004 | Mahajan et al. | 370/390 |

FOREIGN PATENT DOCUMENTS

| JP | 7-170279 | 7/1995 |
| JP | 9-162920 | 6/1997 |
| WO | 97/14239 | 4/1997 |
| WO | WO 98/48343 | * 10/1998 |

OTHER PUBLICATIONS

Fenner, "RFC 2236. Internet Management Group Protocol, Version 2" Nov. 30, 1997, XP002230720, pp. 1-24.
Notice of Rejection mailed Aug. 7, 2007, from the corresponding Japanese Application.

* cited by examiner

*Primary Examiner*—Patrice Winder
(74) *Attorney, Agent, or Firm*—Katten Muchin Rosenman LLP

(57) ABSTRACT

A multicast processing section constructs, when it is determined that a received packet is a packet on a multicast packet and multicast group management protocol, a table showing a correlation between a host device and a multicast group in a port number-multicast physical address correlation storing section as well as in a multicast router-connected port storing section according to the received packet, and controls to transfer a packet for each multicast group between a multicast router and host devices according to the table.

8 Claims, 14 Drawing Sheets

```
      0                   1                   2                   3
      0 1 2 3 4 5 6 7 8 9 0 1 2 3 4 5 6 7 8 9 0 1 2 3 4 5 6 7 8 9 0 1
     +-+-+-+-+-+-+-+-+-+-+-+-+-+-+-+-+-+-+-+-+-+-+-+-+-+-+-+-+-+-+-+-+
     | Version| Type |    Unused     |           Checksum            |
     +-+-+-+-+-+-+-+-+-+-+-+-+-+-+-+-+-+-+-+-+-+-+-+-+-+-+-+-+-+-+-+-+
     |                         Group Address                         |
     +-+-+-+-+-+-+-+-+-+-+-+-+-+-+-+-+-+-+-+-+-+-+-+-+-+-+-+-+-+-+-+-+
```

```
      0                   1                   2                   3
      0 1 2 3 4 5 6 7 8 9 0 1 2 3 4 5 6 7 8 9 0 1 2 3 4 5 6 7 8 9 0 1
     +-+-+-+-+-+-+-+-+-+-+-+-+-+-+-+-+-+-+-+-+-+-+-+-+-+-+-+-+-+-+-+-+
     |     Type      | Max Resp Time |           Checksum            |
     +-+-+-+-+-+-+-+-+-+-+-+-+-+-+-+-+-+-+-+-+-+-+-+-+-+-+-+-+-+-+-+-+
     |                         Group Address                         |
     +-+-+-+-+-+-+-+-+-+-+-+-+-+-+-+-+-+-+-+-+-+-+-+-+-+-+-+-+-+-+-+-+
```

FIG.5

| | MULTICAST ROUTER IP CONNECTED OR NOT | MULTICAST ROUTER IP ADDRESS 1 | MULTICAST ROUTER IP ADDRESS 2 | MULTICAST ROUTER IP ADDRESS 3 | ... | MULTICAST ROUTER IP ADDRESS m |
|---|---|---|---|---|---|---|
| PORT NUMBER 1 | Yes | aaa.aa.aaa.a | | | ... | |
| PORT NUMBER 2 | | | | | ... | |
| PORT NUMBER 3 | | | | | ... | |
| PORT NUMBER 4 | | | | | ... | |
| PORT NUMBER 5 | | | | | ... | |
| PORT NUMBER 6 | | | | | ... | |
| PORT NUMBER 7 | Yes | bbb.bb.bbb.bbb | | | ... | |

```
0                        23                       47
|                        |                        |
0000 0001 0000 0000 0101 1110 0xxx xxxx xxxx xxxx xxxx xxxx
     ↑                        ↑
   Multicast Bit         0=Internet Multicast
```

FIG.7

| MAC HEADER (14 BYTES) | IP HEADER (20 BYTES/NO OPTION) | IGMP MESSAGE (8 BYTES) | FCS |

COMMUNICATION CONTROL UNIT AND COMMUNICATION CONTROL METHOD APPLIED FOR MULTICAST-SUPPORTING LAN

CROSS-REFERENCE TO RELATED APPLICATION

The present application is a continuation application of and claims priority under 35 U.S.C. § 120 from U.S. patent application Ser. No. 09/170,663, which was filed on Oct. 13, 1998 now U.S. Pat. No. 6,457,059 and is hereby incorporated by reference.

FIELD OF THE INVENTION

The present invention relates to a communication control unit for controlling a port to be used, for example, when a packet is transferred by using a multicast-supporting LAN (Local Area Network) as well as to a communication control method applied for a multicast-supporting LAN.

BACKGROUND OF THE INVENTION

In association with rapid and widespread use of personal computers in recent years, LAN has also become increasingly common, while computers and networks themselves have been more advanced and more powerful. In addition, wide use of WWW (World Wide Web) as well as of multimedia data such as moving images and voice is progressing, and the traffic of networks is more and more increasing, so that introduction of network repeater such as a communication control unit and a high speed router, for example, a switching hub allowing large amounts of data to be transmitted with high speed to a network is progressing. Further, data transfer based on a multicast technology has been started as a technology for efficiently transferring large amounts of data, and it may be estimated that the widespread use of data transfer using a multicast is more and more increasing from now on.

Description is made hereinafter for a multicast-supporting LAN in which a conventional type of communication control unit is applied. FIG. 15 is a view showing a construction of the conventional type of multicast-supporting LAN. The multicast-supporting LAN shown in FIG. 15 comprises multicast routers 1001 and 1002 for relaying data transfer using a multicast according to an IP address; communications control units 1101, 1102, and 1103 for switching input/output of a packet with data to be transferred according to MAC addresses; a hub 1201 functioning as, for example, a multiport transceiver; and host devices 1301-1307 each functioning as a terminal. The network construction shown in FIG. 15 is a part of a LAN taken out to describe the network based on the conventional technology.

FIG. 16 and FIG. 17 are views for explaining a general outline of an operation of IGMPv2 (Internet Group Management Protocol Version 2), FIG. 16 shows a sequence for a host device to become a member of a multicast group, and FIG. 17 shows a sequence for a host device to leave a multicast group. It should be noted that FIG. 16 and FIG. 17 show a construction obtained by taking out a part with the multicast router 1001 and host devices 1304 and 1305 from the construction in FIG. 15.

At first, description is made for a method of becoming a member of a multicast group with reference to FIG. 16. It is assumed here that the host device 1305 desires a member of a multicast group, and description is made for the operation within a range of the construction shown in FIG. 16 to make description simpler. The multicast router 1001 periodically transmits a query message (Host Membership Query) to a destination with the IP address 224.0.0.1 (All-Systems-Group) to ask the host devices 1304 and 1305 each connected to a local network to become a member of one of multicast groups and to find out where the desired multicast group exists.

In this case, the host device 1305 having a desire of becoming a member of a multicast group transmits a report message (Host Member Report) to a multicast address of a group hoping to become a member to report the multicast address of which the host device desires a member in response to the received a query from the multicast router 1001.

At this point of time, the host device 1305 trying to transmit a report transmits the report at a random time during a period of time until a Max Response Time (Default: 10 sec) included in the query message is elapsed. If there are a plurality of other host devices each to send a report to the same group as that the report to be sent to, the multicast router receives a first transmitted report by one of host devices, so that the other host devices do not transmit the report. Namely, when a plurality of host devices in a network medium are connected to shared media, only one report for each multicast group is transmitted.

The multicast-supporting router 1001 receives the report, finds out a multicast group of which the host device 1305 desires a member, and starts to transmit, if it is found where a multicast for the multicast group exists, multicast data to a local network based on a multicast routing protocol.

Next description is made as to a method of leaving a multicast group with reference with FIG. 17. It is assumed here that the host device 1305 desires to leave a multicast group, and description is made for the operation within a range of the construction shown in FIG. 17 to make description simpler. The host device 1305 desiring to leave the multicast group of which the device is a member transmits a leave message to the IP address 224.0.0.2 (All-Routers-Group) at the point of time when leaving is decided.

The multicast router 1001 having received the leave transmits a GS query (Group Specific Query) message to the multicast group address to check whether any other host devices each being a member of the multicast group exist or not. If there are some host devices each as a member of the multicast group other than the host device having transmitted the leave, the host device 1305 transmits a report to the multicast router 1001 to convey the existence thereof.

Herein, although there is also Version 1 of IGMP (defined in RFC1112), IGMPv2 supports compatibility with IGMPv1, so that any host device and router supporting Version 1 may exist in a local network. Leave is a message added in IGMPv2, namely, in Version 1, a multicast router finds out existence or leaving of a receiving host device depending on presence or absence of a response with a report to periodical transmission of a query.

Conventionally, unicast physical addresses of terminals each connected to each port are stored in a communication control unit such as a switching hub, and high speed packet transfer of a unicast packet having a unicast physical address of a terminal or of a broadcast packet to terminals is realized only to a target port or target ports based on a hardware switching technology.

As for a multicast packet used for multimedia data transfer, however, it is difficult to discriminate a plurality of particular ports requiring the multicast packet from others as compared to the case of unicast, and for this reason, a multicast packet is not transferred only to ports requiring the multicast packet but is transferred to all ports like the broadcast packet.

The multicast packet as described above has in many cases continuous stream data as well as a large amount of data with a data type of moving images and other data, which causes limitations of processing by the communication control unit, and for this reason, there occur inconveniences such that a disposal rate of multicast packets becomes higher, a transfer delay time becomes longer, or a bad influence is given to transfer of other unicast packet.

Although there is a device for performing message transaction with a multicast router connected to a network using a particular protocol to transfer a multicast packet only to a port of a required communication control unit, the operation of transferring a multicast packet only to a required particular port can not be realized unless the multicast router supporting the particular protocol is combined with the communication control unit.

In the multicast-supporting LAN described above, there is a communication control unit which packages IGMP as a management protocol of a multicast group between a multicast router and host devices on its own, but a merit such that a LAN switch by nature realizes high speed data transfer by forwarding a data packet in a data linked layer may be lost.

When a particular protocol specific to a device is used, connectivity between makers or devices can not be ensured.

It is an object to provide, to solve the problems described above, a communication control unit which can realize efficient transfer for multicast as well as unicast data transfer by transferring multicast data only to required ports with the existing protocol and network construction as well as a communication control method applied for a multicast-supporting LAN.

With the present invention, when it is determined that the received packet is a packet on a multicast as well as multicast group management protocol, a table showing a correlation between the host devices and multicast groups is constructed according to the received packet, and packet transfer for each multicast group between the multicast router and host devices is controlled according to the table, so that a multicast packet can be multicast-transferred only to required host devices with the existing protocol and network construction, and with this feature, it is possible to realize efficient transfer for multicast as well as unicast data transfer.

With the present invention, when it is determined that the packet on the multicast as well as multicast group management protocol is a query, the port having received the packet on a query among a plurality of ports is registered in the table as a port to which the multicast router is connected, so that it is possible to update a correlation between a port and a multicast router as required according to contents of the packet.

With the present invention, when a packet on a query is received, it is controlled to transfer the packet to all the ports other than the port having received the received packet among the plurality of ports, so that the query can surely be transferred to devices under controls by a multicast router.

With the present invention, a ping is periodically transferred to the port to which the multicast router is connected among the plurality of ports by referring to the table, and when there is any port that does not respond to the ping, the correlation between the port and the multicast router is deleted from the table, so that it is possible to update disappearance of a correlation between a multicast router and a port as required according to contents of the packet.

With the present invention, when it is determined that the packet on the multicast as well as multicast group management protocol is a report, the port having received the packet on a report among the plurality of ports is registered in the table as a connecting port used when the host device connected to the port is to be a member of an arbitrary multicast group, so that it is possible to update generation of a correlation between a port and a host device for each multicast group as required according to contents of the packet.

With the present invention, when a packet on a report is received, the packet on a report is controlled to transfer only to the port to which the multicast router is connected by referring to the table, so that the report from the host device can surely be transferred to the multicast router.

With the present invention, when it is determined that the packet on the multicast as well as multicast group management protocol is leave, the port having received the packet on leave among the plurality of ports is deleted from the table regarding as a connecting port used when the host device connected to the port leaves an arbitrary multicast group, so that it is possible to update disappearance of a correlation between a port and a host device for each multicast group as required according to contents of the packet.

With the present invention, when a packet on leave is received, the packet on leave is controlled to transfer only to the port to which the multicast router is connected by referring to the table, so that the leave from the host device can surely be transferred to the multicast router.

With the present invention, when a packet on leave is received, the packet on leave is controlled to transfer to all the ports other than the port having received the packet on leave among the plurality of ports, so that the need for processing of searching a port to which the multicast router is connected is eliminated, and with this feature, it is possible to make low speed processing of leave faster by reducing a load to the processing at the time of leave operation.

With the present invention, when a packet on a group specific query for checking that there is no host device being a member of a multicast group is received, the packet on a group specific query is controlled to transfer, by referring to the table, to ports each to which a multicast router is connected other than the port connecting thereto the host device having been a member of a multicast group as well as the port having received the packet on a group specific query, so that the group specific query does not need to be broadcast, and with this feature, it is possible to efficiently check that there is no host device having been a member of a multicast group.

With the present invention, when a packet on a group specific query is received, the packet on a group specific query is controlled to transfer to all the ports other than the port having received the packet on a group specific query among the plurality of ports, so that the need for processing of searching a port to which the multicast router is connected is eliminated, and with this feature, it is possible to make processing of transferring the group specific query faster by reducing a load to the processing at the time of group specific query operation.

With the present invention, when there is any port from which a report is not responded within a specified period of time after the packet on a query is received, the correlation between the port and the host device is deleted from the table, so that it is possible to update information that becomes nothing to do with multicast packet transfer as required, and with this feature, the processing can efficiently be executed.

With the present invention according to Claim 13, an update operation of the table is executed under controls by the external device, so that a load to the communication control in unit itself can be reduced.

With the present invention, when a packet is received by a port connected to the multicast router, and if the received packet is a multicast packet, the received packet is transferred to the host devices belonging to the multicast group by referring to the table, so that a sequence of checking the multicast group management protocol can be omitted, and with this feature, forwarding of a multicast packet can be made faster.

With the present invention, when a packet is received by a port connected to a host device belonging to a multicast group stored in the table, and if the received packet is a multicast packet, the received packet is transferred to the multicast router belonging to the multicast group by referring to the table, so that a sequence of checking the multicast group management protocol can be omitted, and with this feature, forwarding of a multicast packet can be made faster.

With the present invention, when a packet is received by a port to which the router is connected, and if the received packet is a multicast packet, the received packet is transferred to the multicast router by referring to the table, so that it is possible to ensure the operation of a multicast routing protocol on the network comprising a plurality of multicast routers and a plurality of switching hubs.

With the present invention, when the packet on the multicast as well as multicast group management protocol is a query to ask a host device to become a member of a multicast group, only a first report in each multicast group among reports each having a desire to become a member of a multicast group received by each of the ports is transferred to a corresponding port to which the multicast router is connected by referring the table during the specified period of time preset inside the query, and the following reports are disposed after the specified period of time is elapsed, so that overlaps of reports to a multicast router can be avoided from their transmission even on a network in which the subnet comprises a large number of switching hubs and host devices desiring reception of multicast data are connected to a large number of ports of each of the switching hubs.

With the present invention, even when it is determined that the received packet is a packet on a multicast as well as multicast group management protocol, but if the received packet does not correspond at least to any type of a query to ask a host device to become a member of a multicast group, a report that a host device desires to be a member of a multicast group, and of leave indicating that a host device desires to leave a multicast group, the received packet is transferred to all the plurality of ports, so that when it can not be determined which type a multicast packet corresponds to, the determination can be left to each device as a destination to which the packet is transferred.

With the present invention, even when it is determined that the received packet is a packet on the multicast as well as multicast group management protocol, but if the received packet does not correspond at least to any type of query to ask a host device to become a member of a multicast group, a report that a host device desires to be a member of a multicast group, and of leave indicating that a host device desires to leave a multicast group, the received packet is disposed, so that an unclear type of multicast packet is cleared off from a network, which allows ordinary multicast packet transfer to be more efficient.

With the present invention, there are steps of determining contents of a received packet, and constructing, when it is determined that the received packet is a packet on the multicast as well as multicast group management protocol, a table showing a correlation between the host devices and multicast groups for controlling a path of a multicast packet according to the received packet, so that conditions to control multicast-transfer of a multicast packet only to required host devices with the existing protocol and network construction can be maintained inside the packet.

With the present invention, there is also a step of transferring, when a multicast packet is received from the multicast router, a packet for each multicast group between the multicast router and host devices according to the table showing a correlation between host devices and multicast groups, so that a multicast packet can be multicast-transferred only to required host devices with the existing protocol and network construction, and with this feature, it is possible to realize efficient transfer for multicast as well as unicast data transfer.

Other objects and features of this invention will become understood from the following description with reference to the accompanying drawings.

BRIEF DESCRIPTION OF THE DRAWINGS

FIG. 5 is a view showing an example of contents stored in a multicast router-connected port number stored table;

FIG. 6 is a view for explaining an IGMP packet on Ethernet;

FIG. 7 is a view showing a format of an IGMP message packet;

DESCRIPTION OF THE PREFERRED EMBODIMENT

Detailed description is made hereinafter for preferred embodiments of a communication control unit and a communication control method applied for a multicast-supporting LAN with reference to the related drawings.

Figure 1:
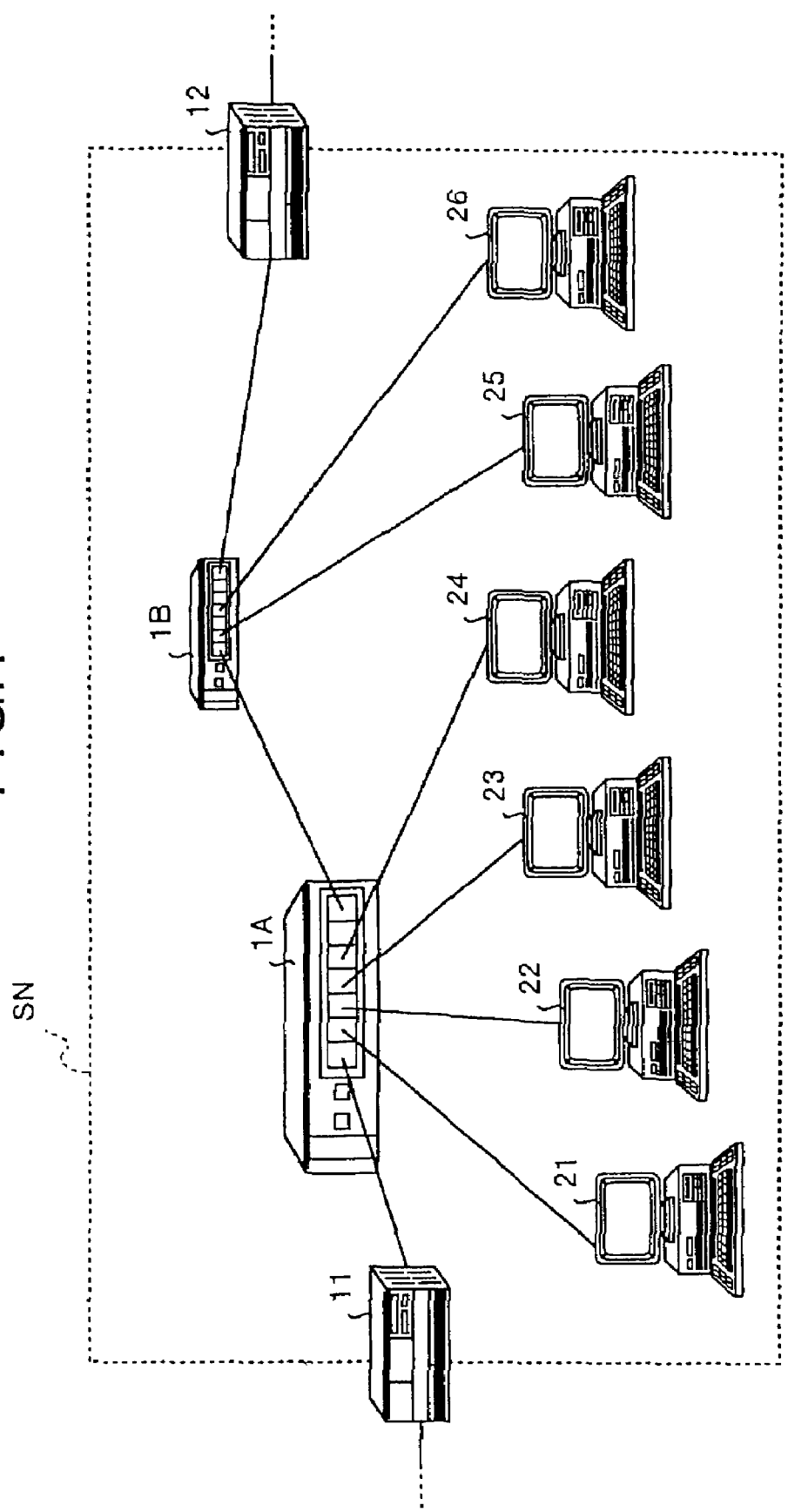
FIG. 1 is a view showing one example of constructing a multicast-supporting LAN in which the communication control unit according to one embodiment of the present invention is applied.

At first, description is made for a multicast-supporting LAN. FIG. 1 is a view showing one example of constructing the multicast-supporting LAN in which the communication control unit according to one embodiment of the present invention is applied. The multicast-supporting LAN shown in the figure shows a section of a subnet SB. This subnet SB comprises two units of communication control unit 1A and 1B serially connected to each other between multicast routers 11 and 12; host devices 21, 22, 23, and 24 connected to the communication control unit 1A; and host devices 25, and 26 connected to the communication control unit 1B.

Herein, the multicast routers 11 and 12 are routers supporting IGMP as a multicast management protocol used for communications with the host devices. The host devices 21 to 26 are devices such as personal computers and work stations, and each has a function operable according to the IGMP. Therefore, existing devices are employed for the multicast routers 11, 12 and the host devices 21 to 26.

Figure 2:
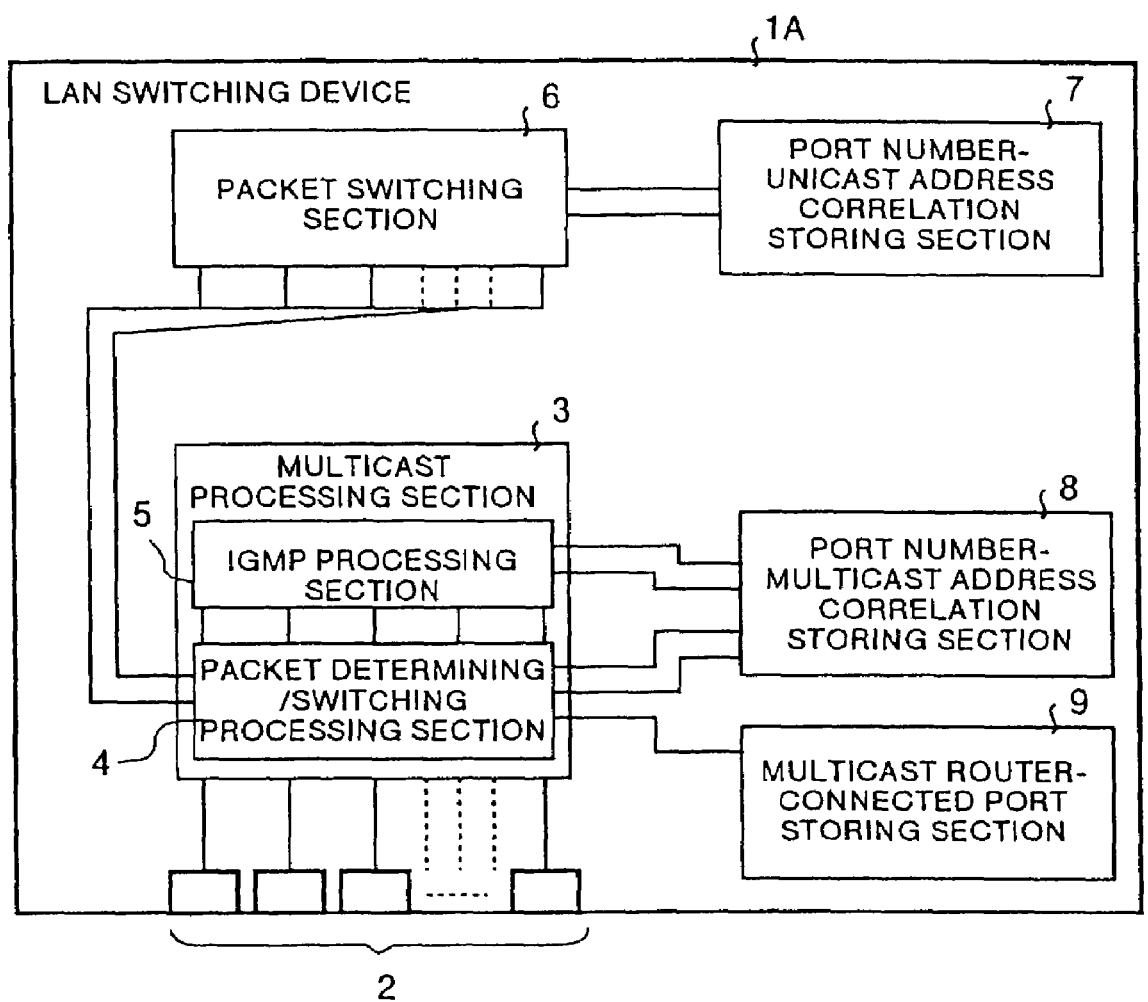
FIG. 2 is a block diagram functionally showing the communication control unit according to one embodiment of the present invention.

Next detailed description is made for the communication control devices 1A and 1B. The construction of the communication control unit 1A has the same as that of the communication control unit 1B concerning functions and hardware, so that description assumes hereinafter the construction of the communication control unit 1A as a representative. FIG. 2 is a block diagram functionally showing the communication control unit 1A according to one embodiment of the present invention.

The communication control unit 1A comprises, as shown in FIG. 2, a port section 2 for connecting thereto the host devices 21 to 24, multicast router 11, and the communication control unit 1B; a multicast processing section 3 comprising a multicast-packet type determining/packet switching section 4 for determining whether a packet received from the port 2 is a multicast packet or an IGMP message packet and processing as a determined type and an IGMP processing section 5 for processing an IGMP message; a packet switching section 6 for performing the same packet transfer as that of the ordinary communication control unit; a port number-unicast address correlation storing section 7 for storing therein a correlation between port numbers and unicast addresses; a port number multicast address correlation storing section 8 for storing therein a correlation between port numbers and multicast addresses; and a multicast router-connected port storing section 9 for storing a correlation between multicast routes and connected ports.

Figure 3:
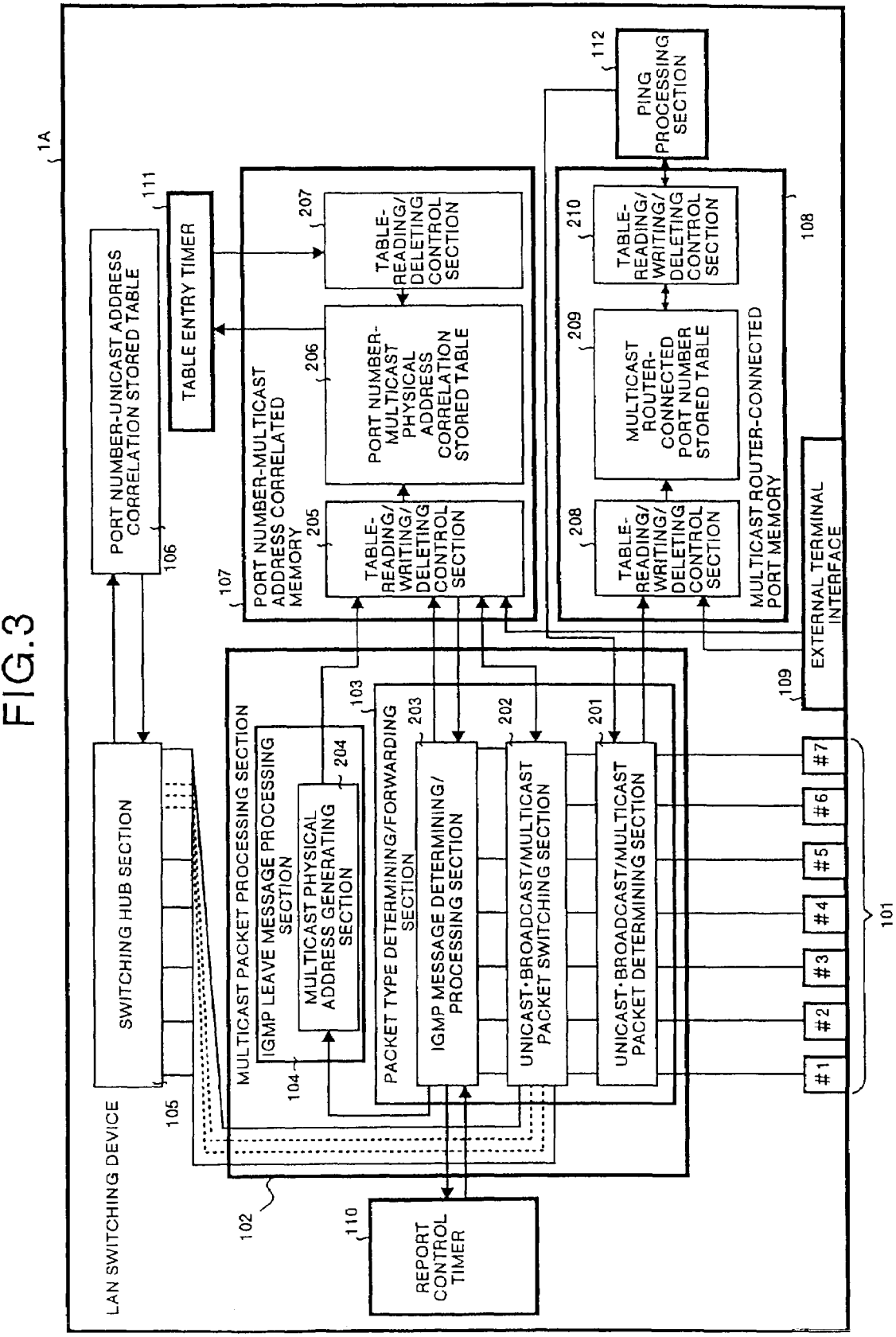
FIG. 3 is a block diagram showing the hardware of the communication control unit according to one embodiment of the present invention.

Next description is made for hardware of the communication control unit 1A functionally shown in FIG. 2 FIG. 3 is a block diagram showing the hardware of the communication control unit 1A.

The communication control unit 1A comprises, as shown in FIG. 3 as one of examples, a port 101 corresponding to the port section 2 for performing the function thereof; a multicast packet processing section 102 as well as a report controlling timer 110 corresponding to the multicast processing section 3 for performing the function thereof; a packet type determining/forwarding section 103 corresponding to the multicast-packet type determining/packet switching section 4 for performing the function thereof; an IGMP Leave message processing section 104 corresponding to the IGMP processing section 5 for performing the function thereof; a switching hub section 105 corresponding to the packet switching section 6 for performing the function thereof; a port number-unicast address correlation stored table 106 corresponding to the port number-unicast address correlation storing section 7 for performing the function thereof; a port number-multicast address correlated memory 107 corresponding to the port number-multicast address correlation storing section 8 for performing the function thereof; a table entry timer 111; a multicast router-connected port memory 108 as well as a ping processing section 112 corresponding to the multicast router-connected port storing section 9 for performing the function thereof; and an external terminal interface 109.

The port 101 is divided, as one example, into seven port numbers. Connected to a port #1, taking up the subnet SN in FIG. 1 as an example, is the multicast router 11, the host devices 21, 22, 23, and 24 are connected to ports #2, #3, #4, and #5 respectively, and the communication control unit 1B is connected to a port #7. It should be noted that a port #6 is not available.

In the multicast packet processing section 102, the packet type determining/forwarding section 103 comprises a unicast•broadcast/multicast packet determining section 201, a unicast•broadcast/multicast packet switching section 202, and an IGMP message determining/processing section 203. The unicast•broadcast/multicast packet determining section 201 determines whether a received packet is a unicast•broadcast packet or a multicast packet.

The unicast•broadcast/multicast packet switching section 202 performs packet transfer according to a case of the unicast•broadcast as well as to a case of the multicast respectively. The IGMP message determining/processing section 203 determines, when it is determined that the received packet is the multicast packet, a type of the IGMP message (query, report, leave) and executes processing according to the type.

Here, a term "query" indicates a message transmitted to each host device from a multicast router to ask the host device to become a member of a multicast group, and a term "report" indicates a message transmitted from a host device to a multicast router to desire a member of a multicast group. A term "leave" indicates a message transmitted from a host device to a multicast router to desire leaving from the multicast group.

The IGMP Leave message processing section 104 comprises a multicast physical address generating section 204. This multicast physical address generating section 204 fetches an IP multicast address included in a section of an IGMP message on Leave, namely of a Leave message from the IGMP message determining/processing section 203, converts the address to a multicast MAC address, and deletes a corresponding correlation between a port number and a multicast MAC address of the port number-multicast address correlated memory 107. The report control timer 110 is connected to the IGMP message determining/processing section 203, and measures, when a received packet is a query, a Max Response Time set in the query at the point of time when the query is received.

The switching hub section 105 and the port number-unicast address correlation stored table 106 realize a function as a switching hub operating in an ordinary communication control unit. Namely, when it is determined in the unicast•broadcast/multicast packet determining section 201 that the received packet is a unicast packet or broadcast packet, the packet for unicast or broadcast is sent to the switching hub 105 through the unicast•broadcast/multicast packet switching section 202, and an ordinary switching operation is executed therein.

The port number-multicast address correlated memory 107 is a memory unit for managing a correlation between each port number of the port 101 and multicast address (each MAC address of host devices as members of the multicast group). This port number-multicast address correlated memory 107 comprises a table-reading/writing/deleting control section 205, a port number-multicast physical address correlation stored table 206, and a table-writing/deleting control section 207.

The port number-multicast physical address correlation stored table 206 stores therein a correlation between each port number of the port 101 and multicast address (each MAC address of host devices as members of the multicast group) as a table. The table-reading/writing/deleting control section 205 updates (read/write/update) the correlation on the port number-multicast physical address correlation stored table 206 according to controls provided by the multicast packet processing section 102.

The table-writing/deleting control section 207 deletes, when it is measured by a table entry timer 111 that a prespecified time or more has passed for a time interval between a query and a report thereto, a corresponding correlation on the port number-multicast physical address correlation stored table 206. The table entry timer 111 measures a time interval between a query and a report thereto in the correlation on the port number-multicast physical address correlation stored table 206.

The multicast router-connected port memory 108 is a memory unit for managing a correlation between each port number of the port 101 and multicast router address. This multicast router-connected port memory 108 comprises a table-reading/writing/deleting control section 208, a multicast router-connected port number stored table 209, and a table-writing/deleting control section 210.

The multicast router-connected port number stored table 209 stores therein a correlation between each port number of the port 101 and multicast router address as a table. The table-reading/writing/deleting control section 208 updates (read/write/update) the correlation on the multicast router-connected port number stored table 209 according to controls provided by the multicast packet processing section 102.

The table-writing/deleting control section 210 deletes, when it is measured by the ping processing section 112 that a prespecified time or more has passed for a time interval until a response to the ping is made to the multicast router, a corresponding correlation (multicast router address) on the multicast router-connected port number stored table 209. The ping processing section 112 measures a response time to a ping in the correlation on the multicast router-connected port number stored table 209.

Herein, the external terminal interface 109 works as an interface between an external device connected thereto and the internal sections. Contents stored in the port number-multicast physical address correlation stored table 206 as well as in the multicast router-connected port number stored table 209 can be updated with a manual by an external device connected to the external terminal interface 109.

Figure 4:
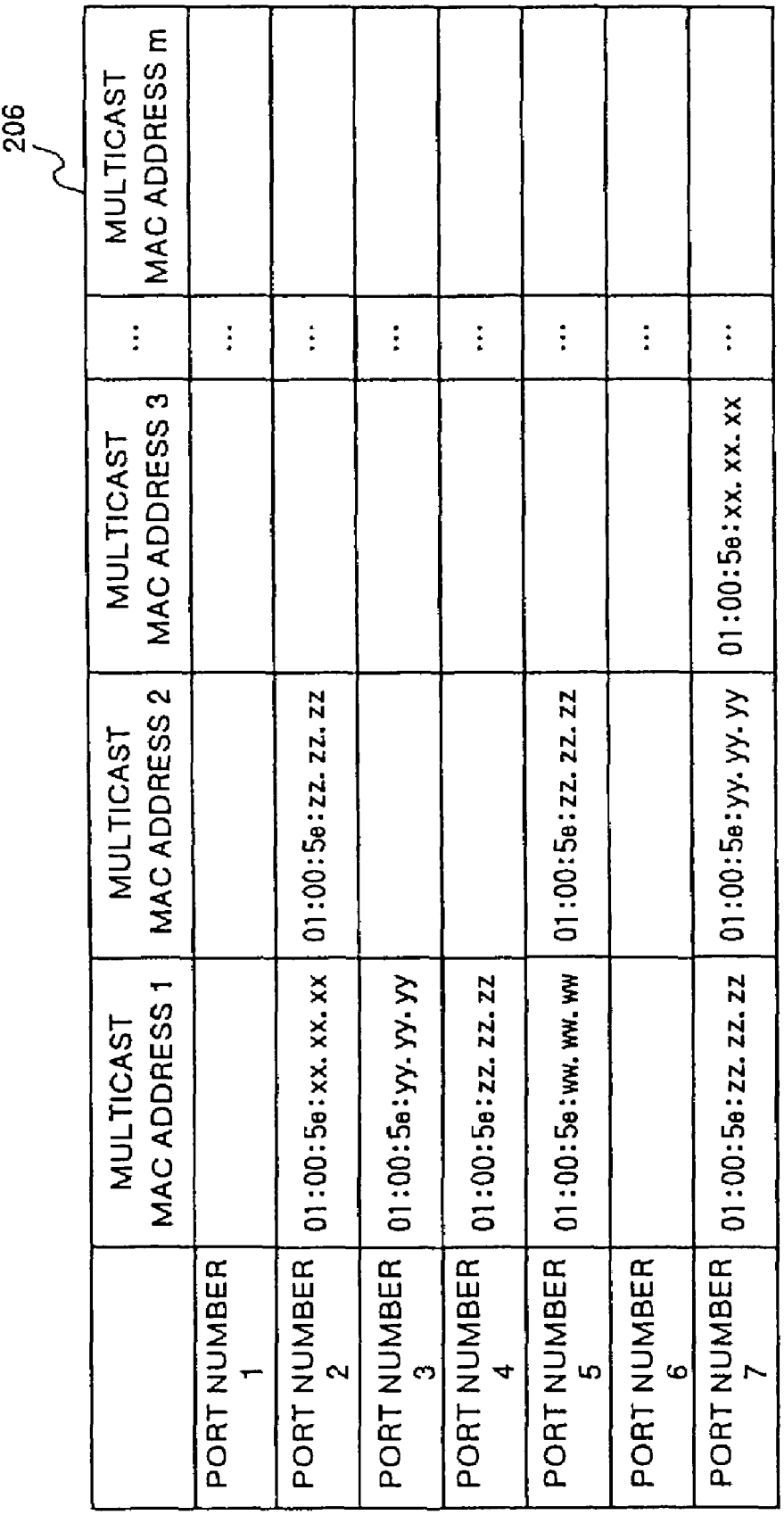
FIG. 4 is a view showing an example of contents stored in a port number-multicast physical address correlation stored table.

Next description is made for contents of the tables. FIG. 4 is a view showing an example of contents stored in the port number-multicast physical address correlation stored table 206, and FIG. 5 is a view showing an example of contents stored in the multicast router-connected port number stored table 209. Each of the stored contents in FIG. 4 and FIG. 5 follows the subnet SN shown in FIG. 1 respectively. FIG. 4 shows a correlation between port numbers and multicast MAC addresses. A number of multicast MAC addresses as far as m-units (m: natural number) can be set to each of the port numbers. In the example of FIG. 4, one or more of multicast MAC addresses are allocated to each of the port numbers 2, 3, 4, 5, and 7.

Allocated to the port number 2 are two addresses of 01:00:5e:xx:xx:xx and 01:00:5e:zz:zz:zz as multicast MAC addresses. Accordingly, the host device 21 is a member of two multicast groups. Allocated to the port number 3 is one address of 01:00:5e:yy:yy:yy as a multicast MAC address.

Accordingly, the host device 22 is a member of one multicast group. Allocated to the port number 4 is one address of 01:00:5e:zz:zz:zz as a multicast MAC address. Accordingly, the host device 23 is a member of one multicast group.

Allocated to the port number 5 are two addresses of 01:00:5e:ww:ww:ww and 01:00:5e:zz:zz:zz as multicast MAC addresses. Accordingly, the host device 24 is a member of two multicast groups. Allocated to the port number 7 are three addresses of 01:00:5e:zz:zz:zz, 01:00:5e:yy:yy:yy, and 01:00:5e:xx:xx:xx as multicast MAC addresses. Accordingly, the host devices 25 and 26 belonging to the communication control unit 1B are members of three multicast groups respectively.

In the multicast MAC addresses, the address 01:00:5e:xx:xx:xx is allocated to the port numbers 2 and 7, which indicates that the host device 21 and the host devices belonging to the communication control unit 1B are members of the common multicast group. The address 01:00:5e:yy:yy:yy is allocated to the port numbers 3 and 7, which indicates that the host device 22 and the host devices belonging to the communication control unit 1B are members of the common multicast group.

The address 01:00:5e:zz:zz:zz is allocated to the port numbers 2, 4, 5, and 7, which indicates that the host devices 21, 23, and 24 as well as the host devices belonging to the communication control unit 1B are members of the common multicast group. The address 01:00:5e:ww:ww:ww is allocated only to the port number 5, which indicates that only the host device 24 in the subnet SN is a member of this multicast group. It should be noted that all the reference signs X, Y, Z, W in the "xx:xx:xx", "yy:yy:yy", "zz:zz:zz", and "ww:ww:ww" do not always show the same number.

FIG. 5 shows a correlation between port numbers and multicast router detected or not/multicast router addresses. The number of multicast router addresses as far as m-units can be set to each of the port numbers. In the example of FIG. 5, one or more of multicast router addresses are allocated to the port numbers 1 and 7. Connected to the port numbers 1 and 7 are the multicast router 11 with the address aaa.aa.aaa.a and the multicast router 12 (through the communication control unit 1B) with the address bbb.bb.bbb.bbb respectively.

Accordingly, in the multicast router-connected port number stored table 209, as shown in FIG. 5, "Connected to multicast router or not" is Yes, and "Multicast router address" is aaa.aa.aaa.a each corresponding to the port number 1, and "Connected to multicast router or not" is Yes, and "Multicast router address" is bbb.bb.bbb.bbb each corresponding to the port number 7. It should be noted that all the reference signs a and b do not always show the same number.

Figure 9:
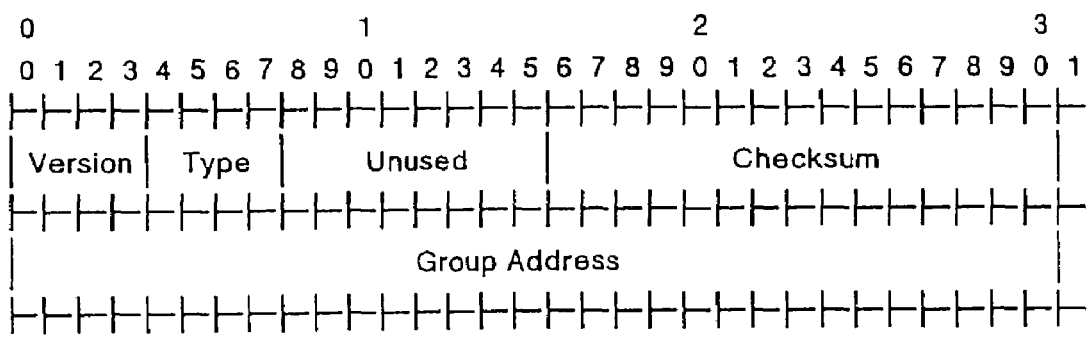
FIG. 9 is a view showing a format of an IGMP Version 1 message.
Figure 10:
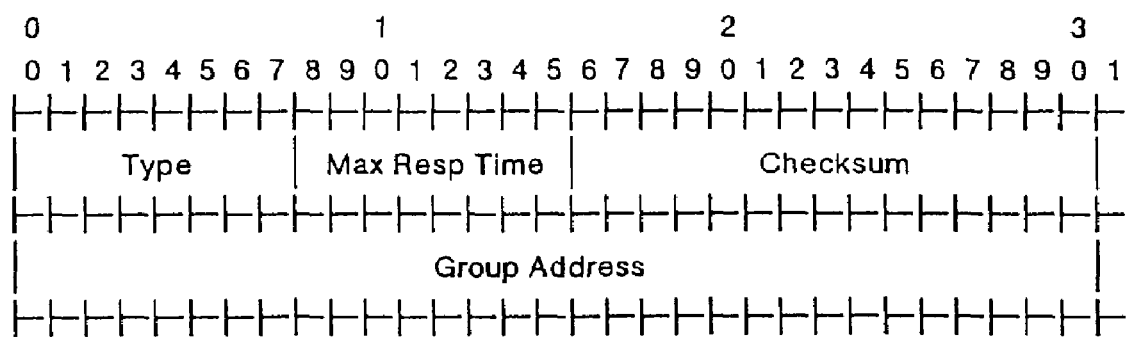
FIG. 10 is a view showing a format of an IGMP Version 2 message.
Figure 11:
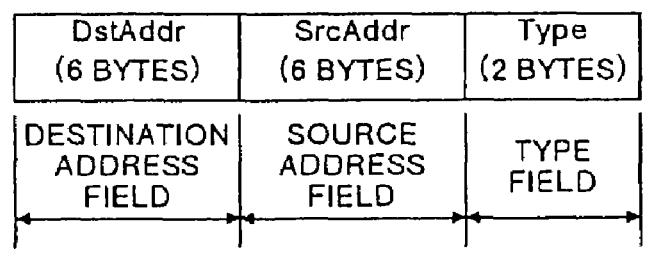
FIG. 11 is a view showing a structure of a MAC header in the case of Ethernet.
Figure 12:
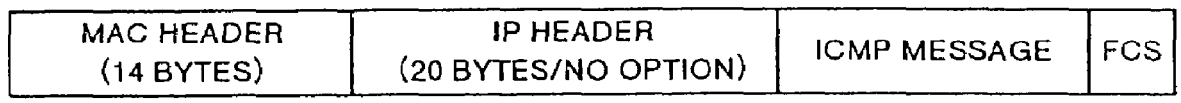
FIG. 12 is a view showing a structure of a ping packet.

Next description is made for a packet. Description below assumes a case that a network media is Ethernet. FIG. 6 is a view for explaining an IGMP packet on Ethernet, FIG. 7 is a view showing a format of an IGMP message packet, FIG. 8 is a view showing a format of an IP header, FIG. 9 is a view showing a format of an IGMP Version 1 message, FIG. 10 is a view showing a format of an IGMP Version 2 message, FIG. 11 is a view showing a structure of a MAC header in the case of Ethernet, and FIG. 12 is a view showing a structure of a ping packet.

In mapping of multicast IP addresses and physical layer addresses, as in the case shown in FIG. 6, a correlation between a multicast IP address (also called an IP address in Class D) and a physical address is defined in the standard (current one is RFC1700) that 23 bits in the low order of an IP address of Class D should be put in 23 bits in the low order of a multicast physical address "01.00.5E.00.00.00 (hexadecimal)". For example, a multicast IP address "239.133.130.34 (hexadecimal)" is a MAC address "01.00.5E.82.22 (hexadecimal)".

The IGMP message packet consists of, as shown in FIG. 7, a MAC header (14 bytes), an IP header (20 bytes, no option), an IGMP message (8 bytes), and a FCS (Flag Check Sequence).

Figure 8:
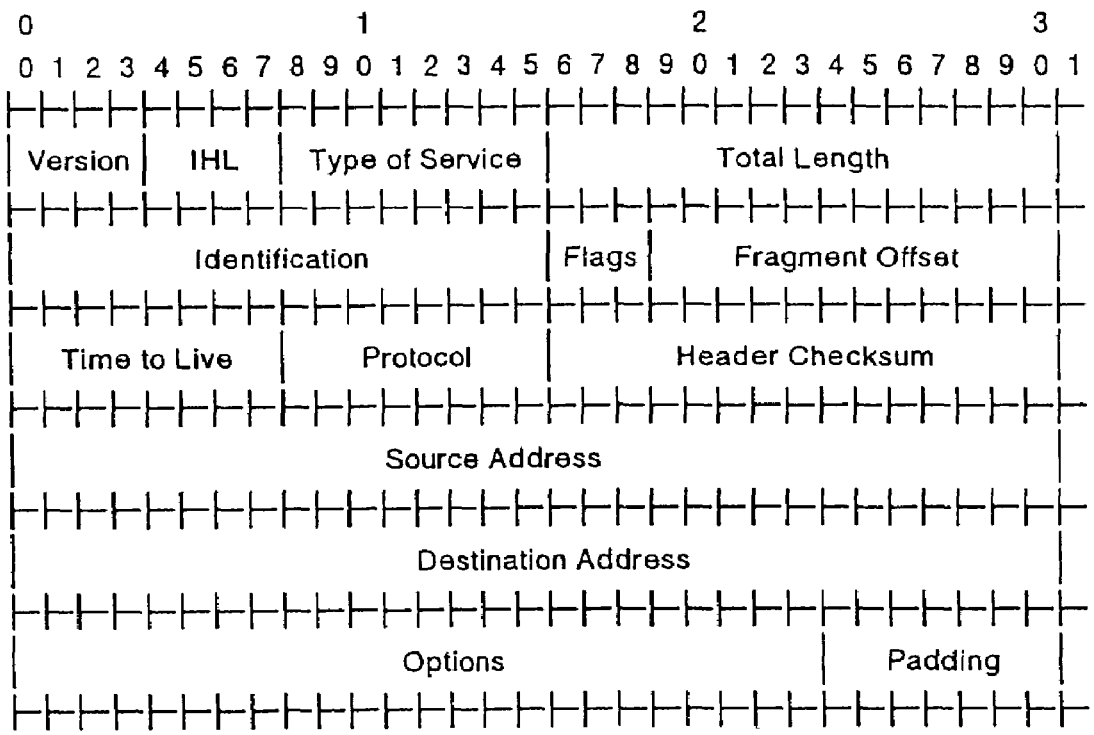
FIG. 8 is a view showing a format of an IP header.

The IP header consists of, as shown in FIG. 8, Version, Header Length (IHL), Type of Service, Packet Length (Total Length), Identification, Flags, Fragment Offset, Time to Live, Protocol, Header Checksum, Source IP Address (Source Address), Destination IP Address (Destination Address), Options, Padding.

The Version consists of 4 bits and indicates a version number of the IP header. The Header Length (IHL) consists of 4 bits and indicates a size of the IP header itself. The Service Type consists of 8 bits and indicates service quality of the transmitted IP. The Packet Length consists of 16 bits and indicates an octet length of an entire packet obtained by adding the IP header and IP data thereto. The Identification consists of 16 bits and is used as reference information when data is transferred to a upper layer. The Flags consists of 3 bits and indicates an instruction to control a division of the packet. The Fragment Offset consists of 13 bits and indicates at which part of an original data each divided fragment is positioned.

The Time to Live consists of 8 bits and indicates a time when the packet may exist on the network in units of second. The Protocol consists of 8 bits and indicates a protocol in the upper layer. The Header Checksum consists of 16 bits and indicates a checksum for the IP header.

The Source IP Address consists of 32 bits and indicates an IP address of the source. The Destination IP Address consists of 32 bits and indicates an IP address of the destination. The Options has a variable length and is used for cases such as a security label, a source route, a route record, and a time stamp. The Padding is used, when the Options is added and if the header does not become an integral multiple of 32 bits, as covering the deficit.

The IGMP Version 1 message consists of, as shown in FIG. 9, Version, Type, Unused, Checksum, and Group Address. The Version consists of 4 bits and indicates Version 1 in RFC 1112. The Type consists of 4 bits and indicates a type of IGMP message. Namely, "1" indicates a query and "2" indicates Report. The Unused consists of 8 bits and indicates zero (0). The Checksum consists of 16 bits and indicates a checksum computed in the same method as that of ICMP. The Group Address consists of 32 bits and indicates zero when the message is a query and also an address of a multicast group of which a host device is to be a member when the message is a report.

The IGMP Version 2 message consists of, as shown in FIG. 10, 8-bit Type, 8-bit Max Response Time (Max Resp Time), Checksum, and Group Address without Version therein. In Version 2, Max Response Time is inserted. This Max Response Time indicates a temporary time for transmitting only a first piece of Report for each multicast address among Reports received from each port to the multicast router.

The MAC header consists of, as shown in FIG. 11, a destination address field for inserting therein a destination MAC address (6 bytes), a source address field for inserting therein a source MAC address (6 bytes), and a type field for inserting therein a protocol type (2 bytes).

The ping packet consists of, as shown in FIG. 12, a MAC header (4 bytes), an IP header (20 bytes, no Options), an ICMP (Internet Control Message Protocol) message, and FCS.

Figure 13:
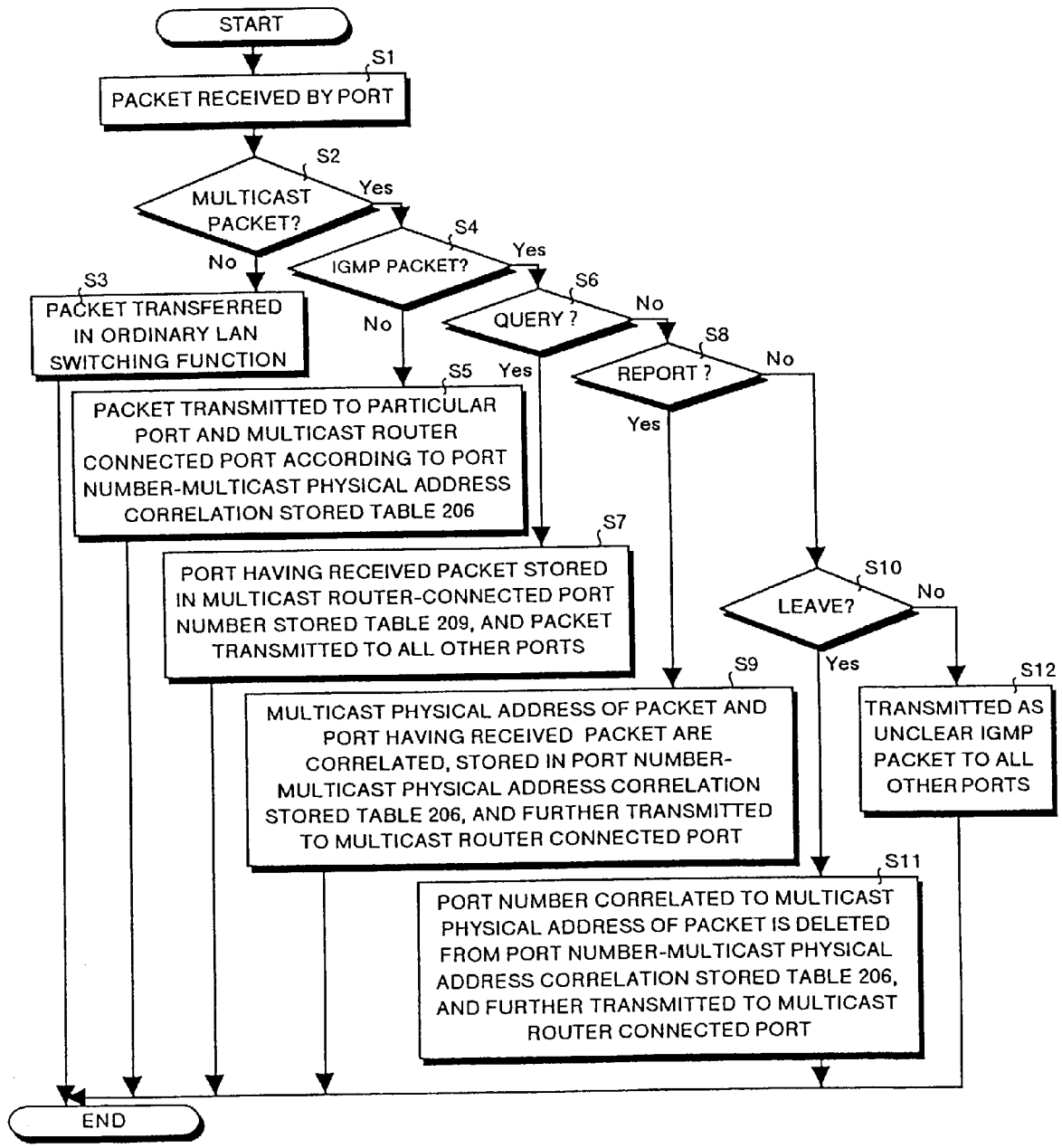
FIG. 13 is a flow chart for explaining a main operation of a communication control unit according to the embodiment.

Next description is made for an operation. FIG. 13 is a flow chart for explaining a main operation of the communication control unit. In the configuration in FIG. 3, when a packet is received by the port 101 (step S1), it is determined in the unicast•broadcast/multicast packet determining section 201 whether the packet is a unicast/broadcast packet or a multicast packet (step S2). A method of determination is performed based on a physical address of a multicast packet. Namely, the MAC address is as shown in FIG. 6, and determination can be made only by confirming that the address is "0000 0001" in 8 bits from the header thereof, which can rapidly be determined by processing in the hardware.

When it is determined that the packet is not a multicast packet (step S2), the packet is transferred by the ordinary LAN switching function (step S3). Namely, the packet is sent to the switching hub section 105 from the unicast•broadcast/multicast packet switching section 202, and is subjected therein to forwarding processing for an ordinary unicast/broadcast packet by referring to the port number-unicast address correlation stored table 106.

On the other hand, when it is determined that the packet is a multicast packet (step S2), it is confirmed whether the multicast packet is multicast data or an IGMP message packet (step S4). For the confirmation, the multicast packet is sent to the IGMP message determining/processing section 203. The IGMP message packet has the format as shown in FIG. 7, and it is determined by confirming that the protocol field in the IP header shown in FIG. 8 is "2". In this case, high-speed determination can be made by processing in the hardware.

Then, when it is determined that the multicast packet is not an IGMP message packet (step S4), the received packet is transferred to the port for connecting thereto a host device as a member of a multicast group as well as other communication control unit by referring to the port number-multicast physical address correlation stored table 206 (step S5). On the other hand, when it is determined that the multicast packet is an IGMP message packet (step S4), it is checked in the following steps of step S6, step S8, and step S10 which type the IGMP message is.

There are two types of version here: Version 1 shown in FIG. 9 and Version 2 shown in FIG. 10. When host devices or multicast routers supporting IGMP Version 1 and IGMP Version 2 exist together with each other, as defined as a function of the IGMP Version 2, an IGMP Version 2-supporting multicast router is defined so that the router can understand a message based on the IGMP Version 1 and perform processing for that. For this reason, there occurs no problems if the IGMP Version 1 and IGMP Version 2 exist together with each other.

Included in the IGMP are a query and a group specific query each as a message transmitted by a multicast router, and a report transmitted by a host device, and further there is leave transmitted by a host device in the IGMP Version 2. Those messages can be differentiated from each other by referring to the type field in the IGMP message. When the operation is performed based on the IGMP Version 1, each type field of a query and a group specific query is 0001 (binary), and the type field of a report is 0010 (binary).

When the operation is performed based on the IGMP Version 2, each type field of a query and a group specific query is 00010001 (0x11), the type field of a report is 00010110 (0x16), the type field of leave is 00010111 (0x17), and the type field of a report for compatibility with IGMP Version 1 is 00010010 (0x12). As described above, it is understood that the above type field is the same as 00010010 obtained by adding the version field of Report based on the IGMP Version 1 to the type field thereof.

Discrimination between a query and a group specific query can be made, because a destination IP address in a query is 224. 0.0.1, namely the MAC address is 01:00:5E:00:00:01 and a group specific query is transmitted to a particular multicast group, as to whether each query has any multicast MAC address other than the addresses described above or not. By referring to those bit arrays, each message can be discriminated between IGMP Version 1 and IGMP Version 2, and this processing can rapidly be performed in the hardware. As for any message not corresponding to the bit arrays described above, the message is deleted with no processing subjected thereto as defined in the standard.

When it is determined that the IGMP packet is a query according to the method of the determination described above (step S6), the port number having received the packet is regarded as being connected to a multicast router and registered in the multicast router-connected port number stored table 209, and the received packet is transmitted to all other ports (step S7).

When it is determined that the IGMP packet is a report (step S8), the multicast physical address of the packet is correlated to a receiving port, and the correlation is registered in the port number-multicast physical address correlation stored table 206. Then, the received packet is transmitted to the multicast router-connected port by referring to the multicast router-connected port number stored table 209 (step S9).

When it is determined that the IGMP packet is leave (step S10), a correlation between the multicast physical address of the packet and a receiving port is retrieved from the port number-multicast physical address correlation stored table 206, and the corresponding correlation is deleted. Then, the received packet is transmitted to the multicast router-connected port by referring to the multicast router-connected port number stored table 209 (step S11).

When it is determined that the IGMP packet does not correspond to any of a query, a report, and leave (step S10), the received packet is regarded as an unclear IGMP packet to be transmitted to all other ports (step S12).

Figure 14:
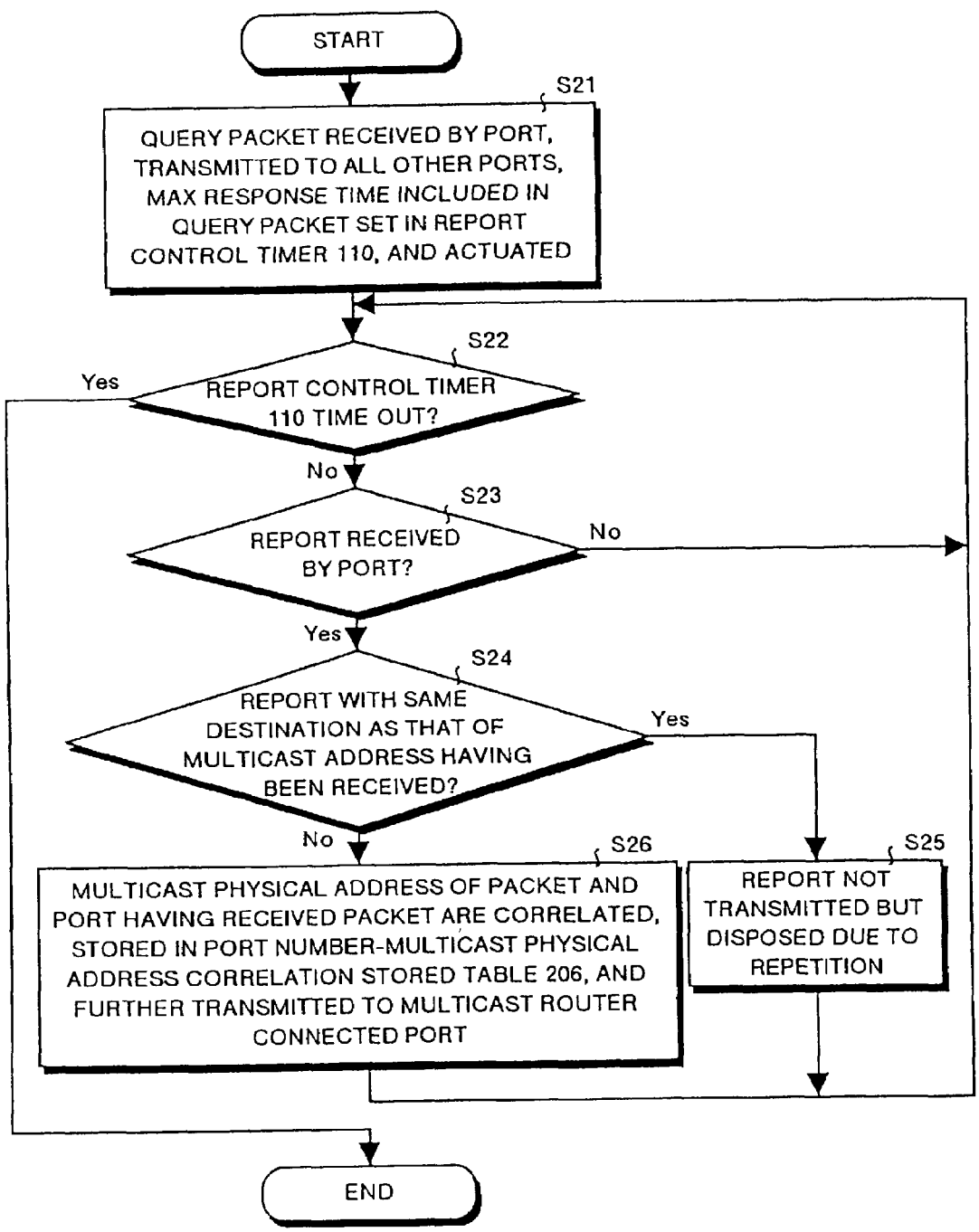
FIG. 14 is a flow chart for explaining an operation at the time of receiving a query.
Figure 15:
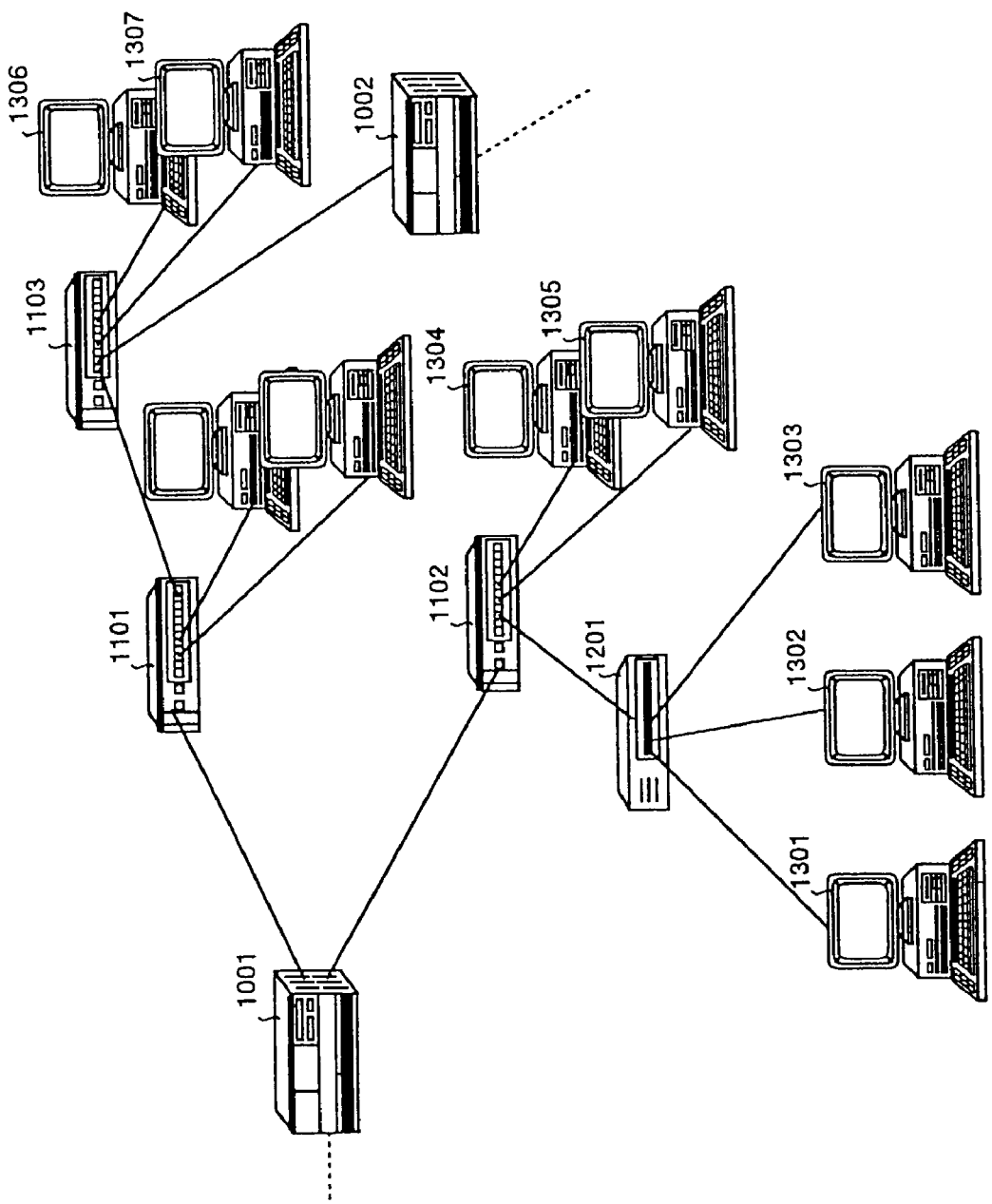
FIG. 15 is a view showing a construction of the conventional type of multicast-supporting LAN.
Figure 16:
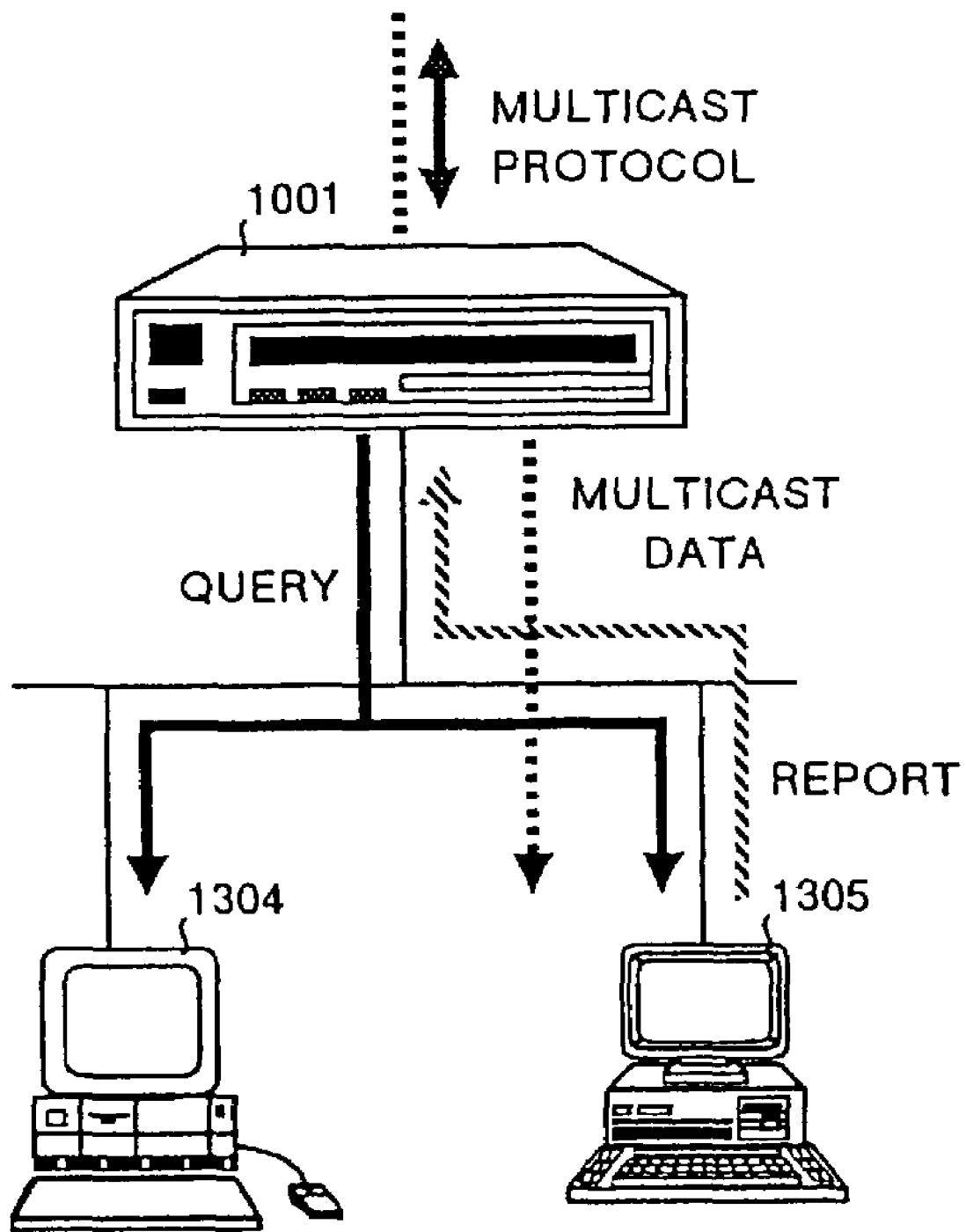
FIG. 16 is a view for explaining a sequence of taking part in a multicast group by a host device.
Figure 17:
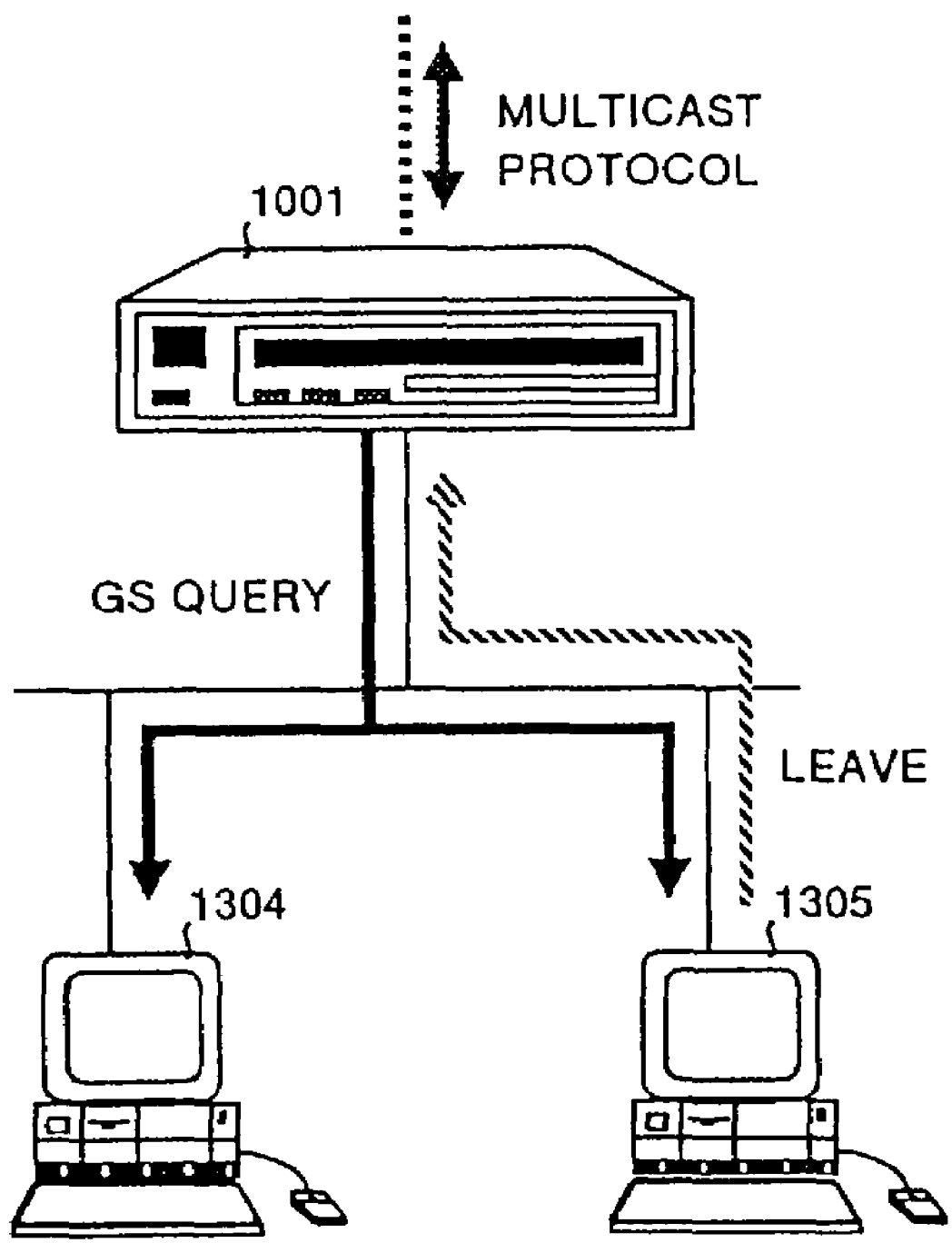
FIG. 17 is a view for explaining a sequence of leaving a multicast group by a host device.

Next description is made for a concrete example of the operation when a query is received by any port connected to the communication control unit 1A or 1B. FIG. 14 is a flow chart for explaining the operation at the time of receiving the query. When a packet on a query is received by a port, the received packet is transmitted to all other ports as described above. Then, the Max Response Time included in the query packet is set in the report control timer 110, and the report control timer 110 is actuated (step S21).

When measurement by the report control timer 110 is completed, namely when it is checked that the Max Response Time is elapsed (step S22), and if it has been completed (elapsed), the processing is ended, and if it has not been completed (not yet elapsed), existence of the port having received report after receiving a query is checked (step S23). As a result, if any port having received Report can not be checked (step S23), the processing returns again to step S22. On the other hand, when a report is received by a port (step S23), it is determined whether the report has the same destination as that of the multicast address of the Report having been received after a query has been received or not (step S24).

As a result, when it is determined that the report has a destination different from that of the report having already been received (step S24), the multicast physical address of the received packet is correlated to the port having received the received packet, and the correlation is registered in the port number-multicast physical address correlation stored table 206.

The received packet is transmitted to the multicast router by referring to the multicast router-connected port number stored table 209 (step S26). Then, the processing returns to step S22. On the other hand, when it is determined that the report has the same destination as that of the Report having already been received (step S24), the received packet should be disposed, because the reports may repeatedly be transmitted to the multicast router, to avoid the repetition in the operation (step S25) Then, the processing returns to step S22.

With the embodiment from description above, a unicast/broadcast packet is discriminated from a multicast packet, and further the multicast packet is discriminated from an IGMP message packet, and if a query is determined as a result of the discrimination, there are realized operations of storing the port number having received the packet and the source address of the query packet in the multicast router-connected port number stored table 209 as an address of the multicast router, and also transmitting the data to ports other than the port having received the query.

With those operations, when the query is received by all the host devices or by other routers, or when the plurality of multicast routers 11, 12 in FIG. 1 are connected to the subnet SN, it is possible to realize an operation of IGMP that the query is received by both of the multicast routers 11, 12 and that determination can be made which of the routers transmits the query in the subnet SN.

As in the subnet SN, for example, when a plurality of multicast routers 11, 12 are connected thereto, it is possible to ensure operations that any of the multicast routers having the smallest address among the queries each received by the routers is decided to be a multicast router for constantly and periodically transmitting a query, while the other multicast routers receive the query, and if the query is not received, it is determined that the multicast router is down, so that a multicast router having the second smallest IP address is decided to be a router for periodically transmitting a query.

As any of the multicast routers 11, 12 transmits a query once, all the multicast routers are stored in the multicast router-connected port number stored table 209, but if it is found out that any of the multicast routers 11, 12 is down or is removed from the subnet SN, the entry of the corresponding multicast router can be deleted from the multicast router-connected port number stored table 209.

For this reason, a source address (address of a multicast router) of a query message as an interface address of the multicast router is concurrently stored when the query is received, and a ping is also transmitted to the multicast router having received the query once by the ping processing section 112, and if a response to the ping does not return, the address entry of the multicast router can automatically deleted from the multicast router-connected port number stored table 209.

It should be noted that the contents stored in the multicast router-connected port number stored table 209 can manually be written therein or deleted therefrom through an external device connected to the external terminal interface 109.

When Report is received by a port, a destination multicast MAC address of the packet and a port number having received the packet are stored in the port number-multicast physical address correlation stored table 206, and are also transferred to the ports stored in the multicast router-connected port number stored table 209. When data having the stored multicast address is inputted in a switching hub, a port number requiring transfer of the multicast data is obtained by referring to the contents stored in the port number-multicast physical address correlation stored table 206, so that it is possible to transfer the data only to a required port.

As for functions of the IGMP, a host device having received Report for the same multicast group executes an operation that the host device does not transfer the Report by its own, and in this case, transferring the multicast packet to the port to which the host device is connected can not be stored in the switching hub, so that the host device can transfer the packet only to the multicast router connected port stored in the multicast router-connected port number stored table 209 and transfer the report message only to the multicast router.

The contents stored in the port number-multicast physical address correlation stored table 206 can be written therein or deleted therefrom through an external device connected to the external terminal interface 109.

When leave is received by a port in a switching hub, the leave may be received only by a multicast router in the first place. Therefore, the packet on the leave may be transmitted only to a multicast router connected port stored in the multicast router-connected port number stored table 209.

In addition, if the received packet is sent to the IGMP Leave message processing section 104, an IP multicast address included in the leave message therein is extracted, and the extracted address is converted to a multicast MAC address in the multicast physical address generating section 204, and if it is found that a correlation between the corresponding port number and multicast MAC address is stored in the port number-multicast physical address correlation stored table 206, it can be programmed to delete the correlation therefrom and not to transmit the data for the multicast address to the port having received the leave.

As for the extraction of an IP multicast address and conversion thereof to a multicast physical address, the IGMP packet format and the address mapping method are defined as shown in FIG. 6, FIG. 9 and FIG. 10, so that high speed processing is capable by hardware.

In addition, the following modification may be considered. When leave is received, in order to make transfer processing of the Leave faster, the leave is not transmitted only to the multicast router connected port stored in the multicast router-connected port number stored table 209, but may quickly be transmitted to all the ports other than that having received the Leave by omitting the processing of referring to the table. Even if the packet is transmitted to a port not requiring it, the packet has a small amount of data, and the IP address of Leave is ALL-ROUTERS-GROUP (224.0.0.2), so that the packet received thereby is ignored, and the port is hardly affected.

When a group specific query is received, the group specific query is transmitted to the multicast address of the Leave transmitted immediately before this transmission. For this reason, it is detected by the IGMP message determining/processing section 203 that the packet is a group specific query, and then if it is found that there is any port stored in the port number-multicast physical address correlation stored table 206 in correlation to the multicast MAC address to which the group specific query is transmitted, the packet is transmitted only to the port and also it can be transferred to ports stored in the multicast router-connected port number stored table 209 other than the port having received the packet.

In addition, the following modification may be considered. When a group specific query is received, in order to make transfer processing of the group specific query faster, the group specific query is not transmitted only to the corresponding port stored in the port number-multicast physical address correlation stored table 206 in correlation to the multicast MAC address to which the group specify query is transmitted as well as to the port stored in the multicast router-connected port number stored table 209, but may quickly be transmitted to all the ports other than that having received the group specific query by omitting the processing of referring to the table.

Even if the packet is transmitted to a port not requiring it, the packet of the group specific query has a small amount of data, and if a host device connected to the port does not require reception of the packet with a destination of a multicast address, the packet is ignored, so that even if the packet is ignored by the host device not requiring it, the port is hardly affected.

Also, the following modification may be considered. As for the operation of IGMP, a host device receiving a query periodically transmitted by a multicast router transmits, when the host device becomes a member of a multicast group to receive multicast data, a report as a response, but does not need to transfer the multicast data to the port with the host device connected thereto, for example, when the application is terminated without transmission of leave used when a host device is to leave a group, or when the power is cut off.

For this reason, when a query is received from a multicast router connected port, a timer is set for each correlation stored in the port number-multicast physical address correlation stored table 206 using the table entry timer 111, and if a report is not received from each of the ports until each timer ends up, a correlation between the multicast physical address and the port number is deleted, and transfer of a multicast packet to the port can be stopped.

When reception of Report and Leave is checked in the IGMP message determining/processing section 203 in the communication control units 1A and 1B, the IGMP packet is sent to an external device connected to the external terminal interface 109, and the external device can update the contents of the port number-multicast physical address correlation stored table 206.

In this case, at least sections of the multicast packet processing section 102 as well as of the report control timer 110 are provided also in the external device, and if the contents of the port number-multicast physical address correlation stored table 206 is updated, the external device updates the contents of the port number-multicast physical address correlation stored table 206, and can perform forwarding of a data packet according to the updated contents.

With this feature, registration of reception of a report to the port number-multicast physical address correlation stored table 206 and a load of a function of deleting the corresponding port as well as the multicast MAC address from the port number-multicast physical address correlation stored table 206 by receiving a leave message can reduce influence over the switching function for data packet as an original function of the switching hub.

There is also considered a modification that targets high speed packet forwarding by omitting a part of the sequence of checking an IGMP message. An IGMP message transmitted from a port stored as a multicast router connected port by having received a query to a particular group (other than the address of ALL-ROUTERS-GROUP or ALL-SYSTEMS-GROUP) to which the multicast router belongs is only the group specific query transmitted by one of the ports in response to reception of a leave message to the address of ALL-ROUTERS-GROUP transmitted by a host device. It is clear from the fact described above that a packet received by multicast connected ports is only multicast data to a particular group or a query until Leave is received by one of the ports.

For this reason, until a leave message having a multicast MAC address existing in the port number-multicast physical address correlation stored table 206 is received by one of the ports, a multicast packet received by a port stored as a multicast router connected port is only checked with contents of the port number-multicast physical address correlation stored table 206 and determining processing whether the packet is an IGMP message or not is omitted.

Then, the received packet is forwarded in the same manner as that for ordinary unicast data by being transmitted to a port correlated to the same multicast physical address as that of the packet, which allows forwarding processing of a multicast packet to be made faster.

In addition, the following modification maybe considered. In the communication control units 1A and 1B, a multicast packet received by a port other than a multicast router connected port is a multicast packet transmitted by a host device, a report or leave in the IGMP. Accordingly, for the purpose of reducing a load to the processing in the switching hub as well as of making the forwarding processing of a data packet faster, a packet having a multicast MAC address received by a port other than the multicast router connected port of a switching hub may be transmitted to all the multicast router connected ports without executing processing whether the packet is an IGMP message or not.

The following modification may also be considered. A packet having a multicast address transmitted through a multicast router connected port includes messages for a multicast routing protocol such as PIM (Protocol Independent Multicast) and DVMRP (Distance Vector Multicast Routing Protocol) other than the IGMP message packet and multicast packet.

For example, each of these messages is, in some cases, transmitted to "ALL-PIM-ROUTERS GROUP (224.0.0.3)" and "DVMRP ROUTERS GROUP (224.0.0.4)" based on a multicast in addition to an adjacent router based on a unicast, so that a multicast packet received by a router connected port may be transmitted to other port stored in the multicast router-connected port number stored table without fail in order to ensure the operation of the multicast routing protocol on the network comprising a plurality of multicast routers and a plurality of switching hubs.

It can be found out in the port having received Report that data with which multicast address the host device connected thereto desires. However, when a subnet comprises a large number of communication control units, and when host devices desiring reception of multicast data are connected to a large number of ports in each of the communication control units, the number of reports transmitted from all the host devices become large to be overlapped.

Then, when a query message transmitted by a multicast router is received, the IGMP message determining/processing section 203 reads a Max Response Time value set inside the query, actuates the report control timer 110 set in a Max Response Time second at the time of receiving the query, transmits only each first report for each multicast address among reports received from ports to a multicast router connected port until the timer ends up, and disposes of the remaining reports. With those operations, it is possible to avoid repetition of transmitting a report to the multicast router.

The following modification may also be considered. An IGMP message can be checked with the fact that the protocol field of an IP header is "2", but, when a type field of an IGMP message is an unknown value and the type thereof can not be determined, the message may be transferred to all the ports other than the port having received the message based on the idea that the determination is left to the host devices belonging to a communication control unit and multicast routers.

The following modification may also be considered. An unknown IGMP type value may be disposed at a stage when the message is received in the communication control units 1A and 1B.

Although the present invention has been described with respect to specific embodiments for a complete and clear disclosure, the appended claims are not be thus limited but are to be construed as embodying all modifications and alternative constructions that may occur to one skilled in the art which fairly fail within the basic teaching herein set forth.

As described above, with the present invention, when it is determined that the received packet is a packet on a multicast as well as multicast group management protocol, a table showing a correlation between the host devices and multicast groups is constructed according to the received packet, and packet transfer for each multicast group between the multicast router and host devices is controlled according to the table, so that a multicast packet can be multicast-transferred only to required host devices with the existing protocol and network construction, and with this feature, it is possible to obtain a communication control unit which can realize efficient transfer for multicast as well as unicast data transfer.

With the present invention, when it is determined that the packet on the multicast as well as multicast group management protocol is a query, the port having received the packet on a query among a plurality of ports is registered in the table as a port to which the multicast router is connected, so that it is possible to obtain a communication control unit which can update a correlation between a port and a multicast router as required according to contents of the packet.

With the present invention, when a packet on a query is received, it is controlled to transfer the packet to all the ports other than the port having received the received packet among the plurality of ports, so that it is possible to obtain a communication control unit which can surely transfer a query to devices under controls by a multicast router.

With the present invention, a ping is periodically transferred to the port to which the multicast router is connected among the plurality of ports by referring to the table, and when there is any port that does not respond to the ping, the correlation between the port and the multicast router is deleted from the table, so that it is possible to obtain a communication control unit which can update disappearance of a correlation between a multicast router and a port as required according to contents of the packet.

With the present invention, when it is determined that a packet on the multicast as well as multicast group management protocol is a report, the port having received the packet on a report among the plurality of ports is registered in the table as a connecting port used when the host device connected to the port is to be a member of an arbitrary multicast group, so that it is possible to obtain a communication control unit which can update generation of a correlation between a port and a host device for each multicast group as required according to contents of the packet.

With the present invention, when a packet on a report is received, the packet on a report is controlled to transfer only to the port to which the multicast router is connected by referring to the table, so that it is possible to obtain a communication control unit which can surely transfer a report from a host device to a multicast router.

With the present invention, when it is determined that a packet on the multicast as well as multicast group management protocol is Leave, the port having received the packet on leave among the plurality of ports is deleted from the table regarding as a connecting port used when the host device connected to the port leaves an arbitrary multicast group, so that it is possible to obtain a communication control unit which can update disappearance of a correlation between a port and a host device for each multicast group as required according to contents of the packet.

With the present invention, when a packet on leave is received, the packet on leave is controlled to transfer only to the port to which the multicast router is connected by referring to the table, so that it is possible to obtain a communication control unit which can surely transfer leave from a host device to a multicast router.

With the present invention, when a packet on leave is received, the packet on leave is controlled to transfer to all the ports other than the port having received the packet on leave among the plurality of ports, so that the need for processing of searching a port to which the multicast router is connected is eliminated, and with this feature, it is possible to obtain a communication control unit which can make low speed processing of leave faster by reducing a load to the processing at the time of leave operation.

With the present invention, when a packet on a group specific query for checking that there is no host device being a member of a multicast group is received, the packet on a group specific query is controlled to transfer, by referring to the table, to ports each to which a multicast router is connected other than the port connecting thereto the host device having been a member of a multicast group as well as the port having received the packet on a group specific query, so that the group specific query does not need to be broadcast, and with this feature, it is possible to obtain a communication control unit which can efficiently check that there is no host device having been a member of a multicast group.

With the present invention, when a packet on a group specific query is received, the packet on a group specific query is controlled to transfer to all the ports other than the port having received the packet on a group specific query among the plurality of ports, so that the need for processing of searching a port to which the multicast router is connected is eliminated, and with this feature, it is possible to obtain a communication control unit which can make processing of transferring the group specific query faster by reducing a load to the processing at the time of group specific query operation.

With the present invention, when there is any port from which Report is not responded within a specified period of time after the packet on a query is received, the correlation between the port and the host device is deleted from the table, so that it is possible to update information that becomes nothing to do with multicast packet transfer as required, and with this feature, it is possible to obtain a communication control unit which can efficiently execute the processing.

With the present invention, an update operation of the table is executed under controls by the external device, so that it is possible to obtain a communication control unit which can reduce a load to the communication control unit itself.

With the present invention, when a packet is received by a port connected to the multicast router, and if the received packet is a multicast packet, the received packet is transferred to the host devices belonging to the multicast group by referring to the table, so that a sequence of checking the multicast group management protocol can be omitted, and with this feature, it is possible to obtain a communication control unit which can make forwarding of a multicast packet faster.

With the present invention, when a packet is received by a port connected to a host device belonging to a multicast group stored in the table, and if the received packet is a multicast packet, the received packet is transferred to the multicast router belonging to the multicast group by referring to the table, so that a sequence of checking the multicast group management protocol can be omitted, and with this feature, it is possible to obtain a communication control unit which can make forwarding of a multicast packet faster.

With the present invention, when a packet is received by a port to which the router is connected, and if the received packet is a multicast packet, the received packet is transferred to the multicast router by referring to the table, so that it is possible to obtain a communication control unit which can ensure the operation of a multicast routing protocol on the network comprising a plurality of multicast routers and a plurality of switching hubs.

With the present invention, when a packet on the multicast as well as multicast group management protocol is a query to ask a host device to become a member of a multicast group, only a first Report in each multicast group among reports each having a desire to become a member of a multicast group received by each of the ports is transferred to a corresponding port to which the multicast router is connected by referring the table during the specified period of time preset inside the query, and the following Reports are disposed after the specified period of time is elapsed, so that it is possible to obtain a communication control unit which can avoid repetition of transmitting Report to a multicast router even on a network in which the subnet comprises a large number of switching hubs and host devices desiring reception of multicast data are connected to a large number of ports of each of the switching hubs.

With the present invention 7, even when it is determined that the received packet is a packet on the multicast as well as multicast group management protocol, but if the received packet does not correspond at least to any type of a query to ask a host device to become a member of a multicast group, a report that a host device desires to be a member of a multicast group, and of leave indicating that a host device desires to leave a multicast group, the received packet is transferred to all the plurality of ports, so that it is possible to obtain a communication control unit which can leave the determination to each device as a destination to which the packet is transferred when it can not be determined which type a multicast packet corresponds to.

With the present invention, even when it is determined that the received packet is a packet on the multicast as well as multicast group management protocol, but if the received packet does not correspond at least to any type of a query to ask a host device to become a member of a multicast group, a report that a host device desires to be a member of a multicast group, and of Leave indicating that a host device desires to leave a multicast group, the received packet is disposed, so that it is possible to obtain a communication control unit which can clear off an unclear type of multicast packet from a network and can enhance efficiency of ordinary multicast packet transfer.

With the present invention, there are steps of determining contents of a received packet, and constructing, when it is determined that the received packet is a packet on the multicast as well as multicast group management protocol, a table showing a correlation between the host devices and multicast groups for controlling a path of a multicast packet according to the received packet, so that it is possible to obtain a communication control method applied for a multicast-supporting LAN which can maintain conditions to control multicast-transfer of a multicast packet only to required host devices with the existing protocol and network construction inside the packet.

With the present invention, there is also a step of transferring, when a multicast packet is received from a multicast router, a packet for each multicast group between the multicast router and host devices according to the table showing a correlation between host devices and multicast groups, so that a multicast packet can be multicast-transferred only to required host devices with the existing protocol and network construction, and with this feature, it is possible to obtain a communication control method applied for a multicast-supporting LAN which can realize efficient transfer for multicast as well as unicast data transfer.

This application is based on Japanese patent application No. HEI 10-170339 filed in the Japanese Patent Office on Jun. 17, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of transmitting a packet in a network, comprising:
    receiving a packet from a first port;
    determining that the received packet from the first port is a first message packet that has been transmitted under a multicast group management protocol to query whether the network includes any active members of a multicast group;
    setting a timer in a controller after determining that the received packet is the first message packet; and
    transmitting the received packet through one or more ports other than the first port,
    wherein the first message packet includes a type field reflecting one of a plurality of versions of the multicast group management protocol, and
    wherein said determining includes checking whether the received packet from the first port includes the type field of the first message packet according to any one of the plurality of versions of the multicast group management protocol.

2. A method according to claim 1, further comprising:
    storing data indicating that the first port is connected to a multicast router.

3. A method according to claim 1, wherein the first message packet has been transmitted under the multicast group management protocol to query whether the network includes any active members of a specific multicast group.

4. A method according to claim 1, wherein the first message packet has been transmitted under the multicast group management protocol to query whether the network includes any active members of any multicast groups.

5. A method of transmitting a packet in a network, comprising:
    receiving a packet from a port connected to a host device;
    determining that the received packet from the port connected to the host device is a second message packet that has been transmitted under a multicast group management protocol in response to a first message packet, the first message packet having been transmitted under the multicast group management protocol to query whether the network includes any active members of a multicast group;
    transmitting the received packet only to one or more other ports connected to one or more multicast routers upon determining that the received packet is the second message packet,
    wherein the second message packet includes a type field reflecting one of a plurality of versions of the multicast group management protocol, and
    wherein said determining includes checking whether the received packet from the second port includes the type field of the second message packet according to any one of the plurality of versions of the multicast group management protocol.

6. A method according to claim 5, further comprising:
    correlating a multicast physical address of the multicast group with the port connected to the host device upon determining that the received packet is the second message packet.

7. A method according to claim 5, wherein the first message packet has been transmitted under the multicast group management protocol to query whether the network includes any active members of a specific multicast group.

8. A method according to claim 5, wherein the first message packet has been transmitted under the multicast group management protocol to query whether the network includes any active members of any multicast groups.

* * * * *